US012503050B2

(12) United States Patent
Heydari et al.

(10) Patent No.: US 12,503,050 B2
(45) Date of Patent: *Dec. 23, 2025

(54) CAUSING IMAGES PRODUCED BY A WIRELESS CAMERA TO BE PRESENTED ON A DISPLAY DISPOSED ON A VEHICLE

(71) Applicant: Toyota Motor North America, Inc., Plano, TX (US)

(72) Inventors: Saeed D. Heydari, Plano, TX (US); Michael J. Nocket, Frisco, TX (US); Tyler J. Kass, Hickory Creek, TX (US)

(73) Assignees: Toyota Motor North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 83 days.

This patent is subject to a terminal disclaimer.

(21) Appl. No.: 18/403,851

(22) Filed: Jan. 4, 2024

(65) Prior Publication Data
US 2025/0222868 A1    Jul. 10, 2025

(51) Int. Cl.
*B60R 1/22*    (2022.01)
*H04W 84/12*    (2009.01)

(52) U.S. Cl.
CPC ............... *B60R 1/22* (2022.01); *H04W 84/12* (2013.01)

(58) Field of Classification Search
CPC ............... B60R 1/26; B60R 2300/306; B60R 2300/8093; B60R 1/22; G06F 3/1423;
(Continued)

(56) References Cited

U.S. PATENT DOCUMENTS 11,064,165 B2    7/2021 Kiliman
11,385,325 B2    7/2022 Brown et al.
(Continued)

FOREIGN PATENT DOCUMENTS

CN    207168999 U    4/2018
GB    2486425 A    6/2012

OTHER PUBLICATIONS

Unknown, "Android / Wireless Cp Aa Interface Box For Toyota Sienna 2022 Video Interface With Gvif Avalon Rav4 C-hr Corolla—Vehicle Gps—AliExpress" 5 pages, found at https://www.aliexpress.com/i/3256804088340600.html?gatewayAdapt=4itemAdapt.
(Continued)

*Primary Examiner* — Farzana Hossain
(74) *Attorney, Agent, or Firm* — Christopher G. Darrow; DARROW MUSTAFA PC

(57) ABSTRACT

A video interface for signals between a wireless camera and a display, disposed on a vehicle, can include a microcontroller, a first port, and a second port. The microcontroller can be configured to process analog signals to produce digital signals. The analog signals can represent images produced by the wireless camera. The digital signals can represent the images for the display. The first port can be configured to be connected to an antenna, disposed on the vehicle, for the analog signals. For example, the wireless camera can be configured to be mounted on a trailer configured to be towed by the vehicle. The second port can be configured to be connected to a cable for the display. The video interface can be configured to be disposed on the vehicle. The wireless camera can have two external single pole antennas.

20 Claims, 6 Drawing Sheets

(58) Field of Classification Search
CPC ...... H04N 5/2628; H04N 7/181; B60K 35/28; B60K 2360/21; H04W 84/12
See application file for complete search history.

(56) References Cited

U.S. PATENT DOCUMENTS

| | | |
|---|---|---|
| 2008/0291077 A1 | 11/2008 | Chang |
| 2008/0309762 A1 | 12/2008 | Howard et al. |
| 2010/0162427 A1* | 6/2010 | Riechmann .......... C07K 14/415 |
| | | 800/290 |
| 2012/0149432 A1 | 6/2012 | Lablans |
| 2012/0162427 A1 | 6/2012 | Lynam |
| 2013/0038731 A1 | 2/2013 | Brey et al. |
| 2013/0188050 A1* | 7/2013 | Winget ................. G08G 1/168 |
| | | 348/148 |
| 2017/0217372 A1 | 8/2017 | Lu et al. |
| 2018/0224524 A1 | 8/2018 | Gunn et al. |
| 2019/0356401 A1 | 11/2019 | Levy et al. |
| 2024/0064274 A1* | 2/2024 | Blank ...................... B60R 1/25 |
| 2025/0012895 A1 | 1/2025 | Javadi et al. |

OTHER PUBLICATIONS

Morales et al., "Driver Assistance System for Backward Maneuvers in Passive Multi-trailer Vehicles," 2012 IEEE/RSJ International Conference on Intelligent Robots and Systems, 2012, pp. 4853-4858.

Xu et al., "Depth Information Guided Crowd Counting for Complex Crowd Scenes," Pattern Recognition Letters, vol. 125, Jul. 1, 2019, pp. 563-569.

Unknown, "Backup camera," Wikipedia, Retrieved Nov. 23, 2023, 4 pages, found at https://en.wikipedia.org/wiki/Backup_camera.

Unknown, "Rear-view mirror," Wikipedia, Retrieved Nov. 22, 2023, 5 pages, found at https://en.wikipedia.org/wiki/Rear-view_mirror.

Toyota Motor North America, "Summary of Toyota Benchmarking Study Regarding Wireless Cameras for Trailer" 2 pages.

Halperin et al. "802.11 with Multiple Antennas for Dummies", ACM SIGCOMM Computer Communication Review, vol. 40, issue 1. 2010.

Notice of Allowance for U.S. Appl. No. 18/499,070, mailed on May 15, 2025, 14 pages.

Non-Final Office Action for U.S. Appl. No. 18/403,921, mailed on Apr. 17, 2025, 17 pages.

* cited by examiner

CAUSING IMAGES PRODUCED BY A WIRELESS CAMERA TO BE PRESENTED ON A DISPLAY DISPOSED ON A VEHICLE

TECHNICAL FIELD

The disclosed technologies are directed to causing images produced by a wireless camera to be presented on a display disposed on a vehicle.

BACKGROUND

Because a motor vehicle can move at a high speed, having an ability for an operator of the motor vehicle to be able see an object behind the motor vehicle while a head of the operator remains facing forward can be desirable. In support of such an ability, rearview mirrors have been disposed on motor vehicles since at least the start of the Twentieth Century. In further support of an ability for an operator to be able to see an object in a vicinity of a motor vehicle while a head of the operator remains facing forward, driver's side side-view mirrors have also been disposed on motor vehicles since the mid-1960s, and passenger's side side-view mirrors have also been disposed on motor vehicles since the 1970s. More recently, reversing cameras can be disposed on motor vehicles so that operators can see objects behind motor vehicles at positions at which the operators may be unable to see such objects using rearview mirrors.

SUMMARY

In an embodiment, a video interface for signals between a wireless camera and a display, disposed on a vehicle, can include a microcontroller, a first port, and a second port. The microcontroller can be configured to process analog signals to produce digital signals. The analog signals can represent images produced by the wireless camera. The digital signals can represent the images for the display. The first port can be configured to be connected to an antenna, disposed on the vehicle, for the analog signals. The second port can be configured to be connected to a cable for the display. The video interface can be configured to be disposed on the vehicle. The wireless camera can have two external single pole antennas.

In another embodiment, a method for causing images produced by a wireless camera to be presented on a display, disposed on a vehicle, can include causing, by a video interface disposed on the vehicle, a wireless local area network to be established between the wireless camera and the video interface. The method can include receiving, by the video interface via an antenna disposed on the vehicle, analog signals. The analog signals can represent images produced by the wireless camera. The method can include producing, by the video interface, digital signals. The digital signals can represent the images for the display. The method can include causing, by the video interface, the digital signals to be conveyed to the display. The wireless camera can have two external single pole antennas.

In another embodiment, a non-transitory computer-readable medium for causing images produced by a wireless camera to be presented on a display, disposed on a vehicle, can include instructions that, when executed by one or more processors, cause the one or more processors to cause a wireless local area network to be established between the wireless camera and a video interface disposed on the vehicle. The non-transitory computer-readable medium can include instructions that, when executed by the one or more processors, cause the one or more processors to receive, via an antenna disposed on the vehicle, analog signals. The analog signals can represent images produced by the wireless camera. The non-transitory computer-readable medium can include instructions that, when executed by the one or more processors, cause the one or more processors to produce digital signals. The digital signals can represent the images for the display. The non-transitory computer-readable medium can include instructions that, when executed by the one or more processors, cause the one or more processors to cause the digital signals to be conveyed to the display. The wireless camera can have two external single pole antennas.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

The disclosed technologies can cause images produced by a wireless camera to be presented on a display disposed on a vehicle. The disclosed technologies can include a video interface for signals between a wireless camera and a display disposed on a vehicle. The video interface can include a microcontroller, a first port, and a second port. The microcontroller can be configured to process analog signals to produce digital signals. The analog signals can represent images produced by the wireless camera. The digital signals can represent the images for the display. The first port can be configured to be connected to an antenna, disposed on the vehicle, for the analog signals. The second port can be configured to be connected to a cable for the display. The video interface can be configured to be disposed on the vehicle. The wireless camera can have two external single pole antennas. For example, the video interface can be a gigabit video interface. For example, the wireless camera can be configured to be mounted on a trailer configured to be towed by the vehicle. For example, the video interface can be configured to establish a wireless local area network with the wireless camera to receive the analog signals from the wireless camera. For example, the wireless local area network can be configured to operate in accordance with a Wi-Fi® wireless network protocol. For example, the display can be a head unit display. As an alternative, for example, the display can be a digital rearview mirror display. As another alternative, for example, the display can be one of an in-car entertainment display, a combination meter display (instrument display), a head-up display (HUD), a digital side-view mirror display, or the like.

Figure 1A:
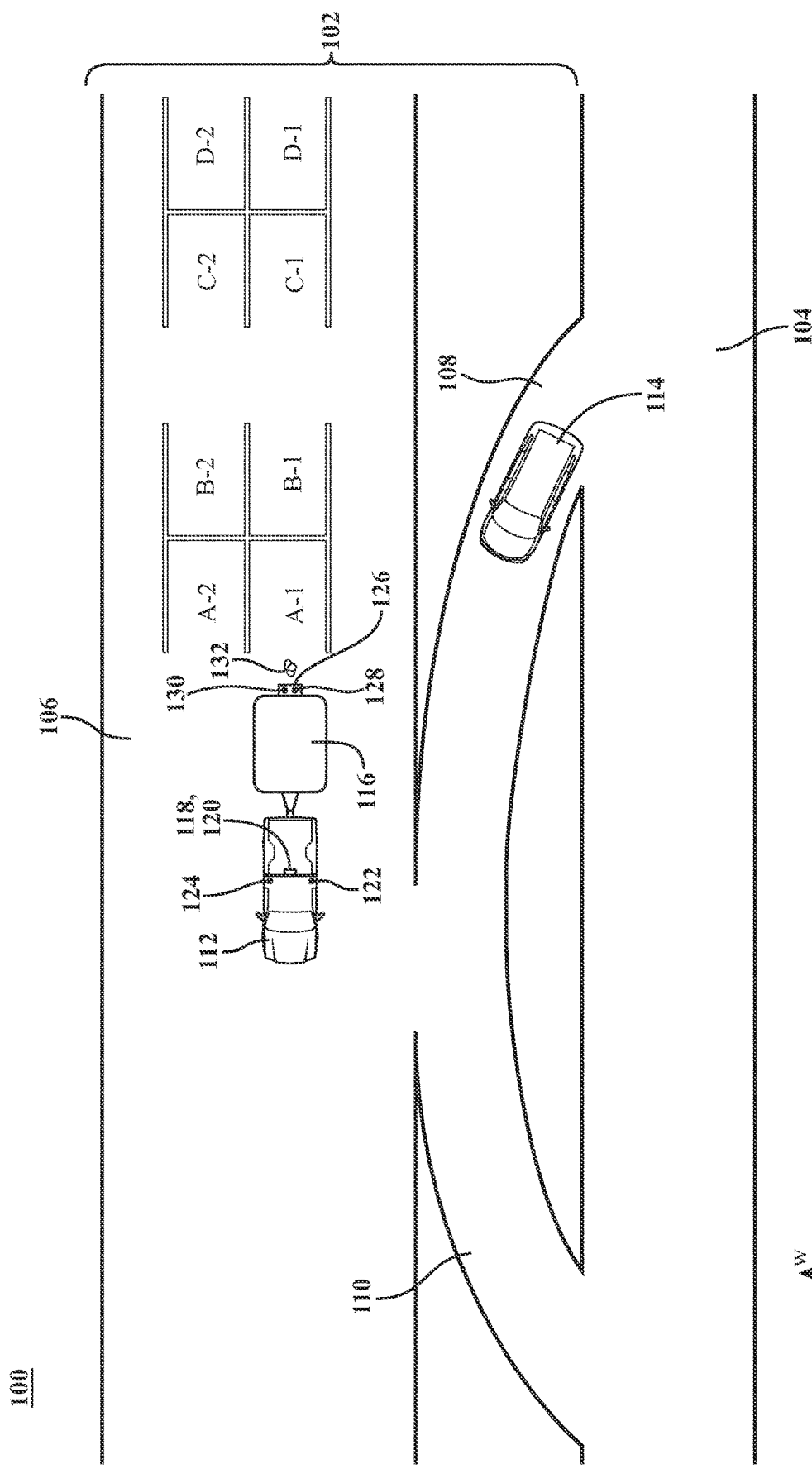
FIGS. 1A and 1B include diagrams that illustrate an example of an environment associated with causing images produced by a wireless camera to be presented on a display disposed on a vehicle, according to the disclosed technologies.
Figure 1B:
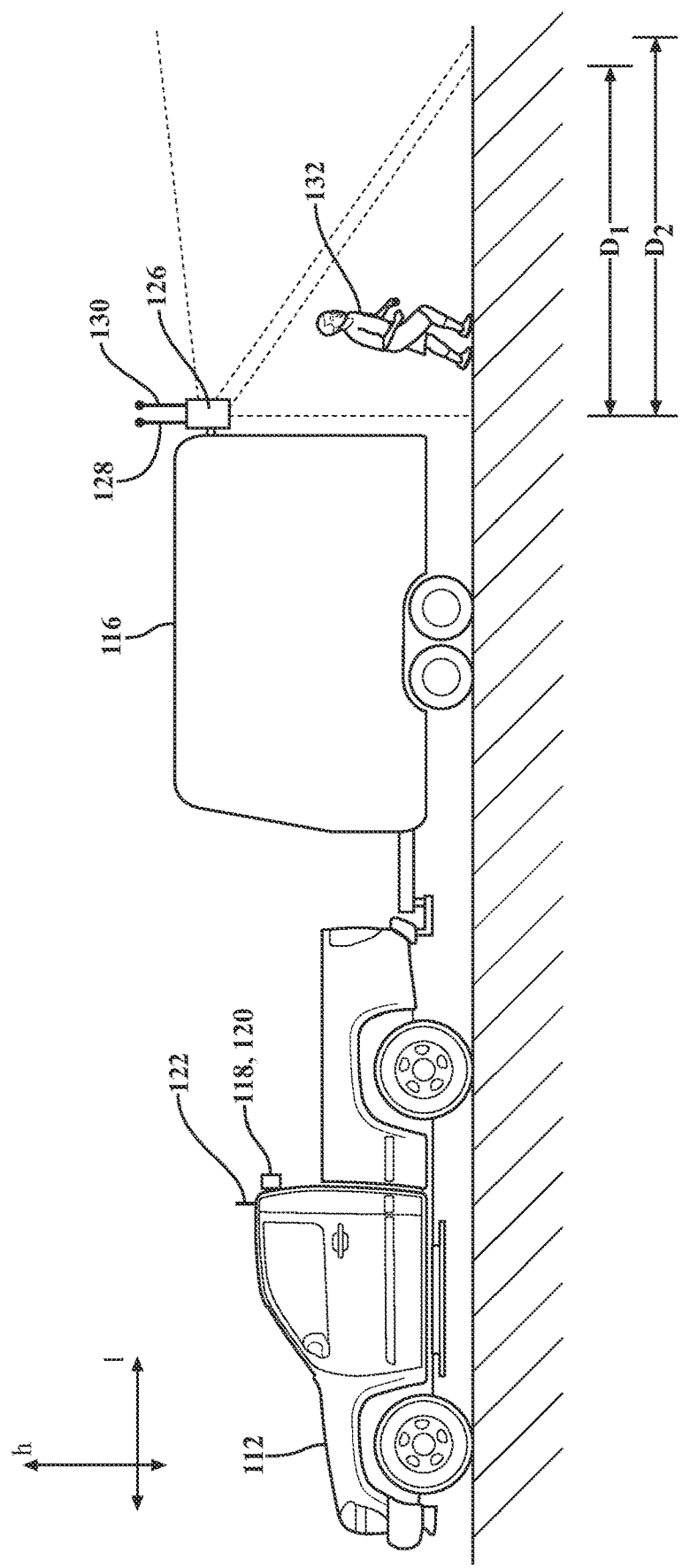

FIGS. 1A and 1B include diagrams that illustrate an example of an environment 100 associated with causing images produced by a wireless camera to be presented on a display disposed on a vehicle, according to the disclosed technologies. FIG. 1A includes a diagram that illustrates an example of the environment 100 from a perspective of a width-length (w-l) coordinate system. FIG. 1B includes a diagram that illustrates an example of the environment 100 from a perspective of a height-length (h-l) coordinate system. For example, the environment 100 can include a rest area 102 and a road 104. For example, the rest area 102 can include a parking lot 106, an offramp 108, and an onramp 110. For example: (1) the offramp 108 can connect the road 104 to the parking lot 106 and (2) the onramp 110 can connect the parking lot 106 to the road 104. For example, the parking lot 106 can include eight parking spaces in four rows: a row A, a row B, a row C, and a row D. For example, the row A can include a parking space A-1 and a parking space A-2, the row B can include a parking space B-1 and a parking space B-2, the row C can include a parking space C-1 and a parking space C-2, and the row D can include a parking space D-1 and a parking space D-2.

For example, the environment 100 can include a first vehicle 112 and a second vehicle 114. For example, the first vehicle 112 can be towing a trailer 116. For example, the first vehicle 112 can be at a location to cause, in response to a movement in a reverse direction, the trailer 116 to be parked in the parking space A-1. For example, a vehicle body-mounted camera 118 can be disposed on the first vehicle 112. For example, the vehicle body-mounted camera 118 can be a center high-mounted stop lamp camera 120. For example, a first antenna 122 can be disposed at a left, rear corner of a roof of the first vehicle 112. For example, a second antenna 124 can be disposed at a right, rear corner of the roof of the first vehicle 112. For example, a wireless camera 126 can be mounted on the trailer 116. For example, the wireless camera 126 can have a first external single pole antenna 128 and a second external single pole antenna 130. For example, the second vehicle 114 can be located on the offramp 108. For example, a child 132 can be behind the trailer 116.

Figure 2:
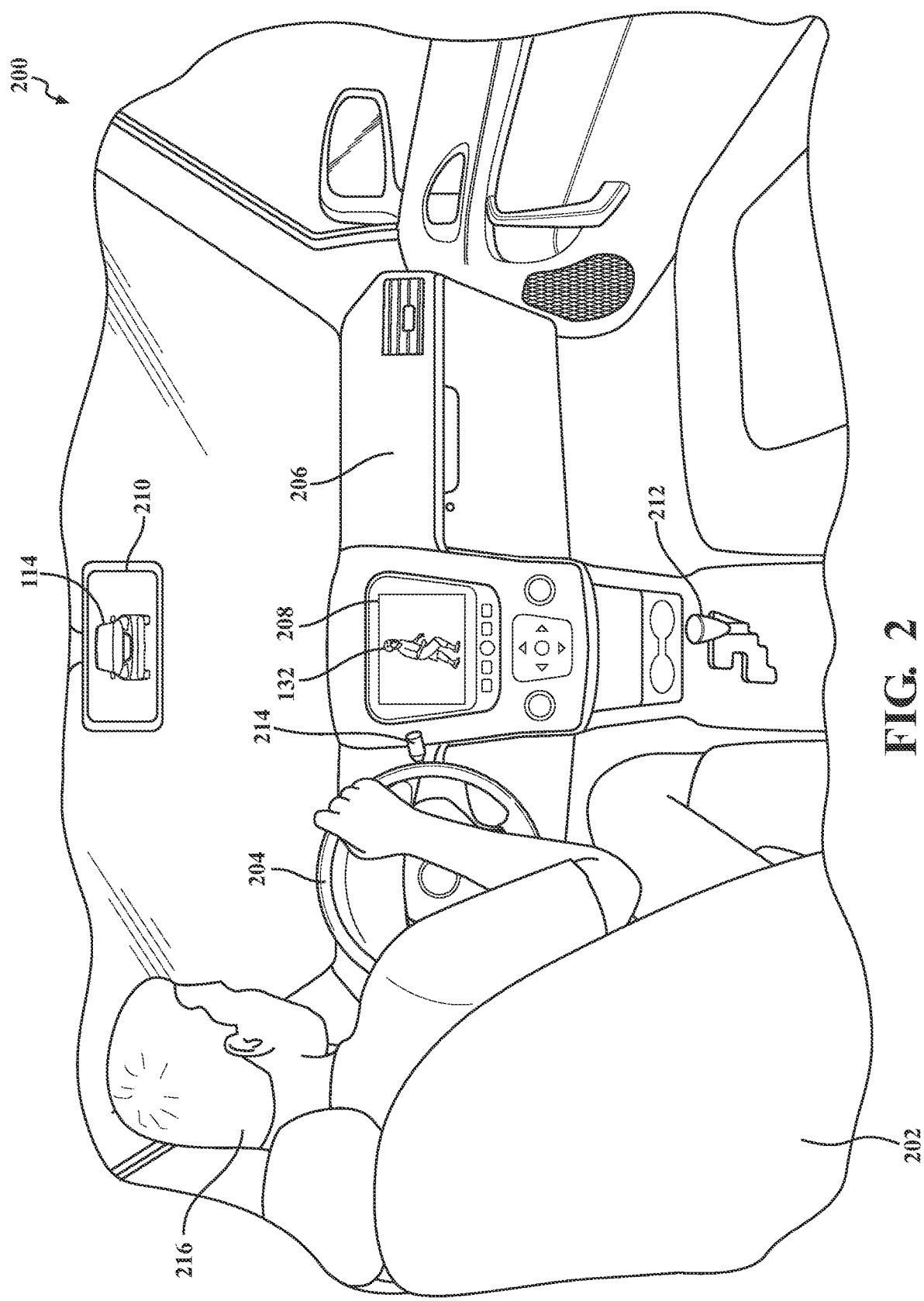
FIG. 2 includes a diagram that illustrates an example of a cabin of the first vehicle illustrated in FIGS. 1A and 1B, according to the disclosed technologies.

FIG. 2 includes a diagram that illustrates an example of a cabin 200 of the first vehicle 112, according to the disclosed technologies. For example, the cabin 200 can include a car seat 202, a steering wheel 204, a dashboard 206, a head unit display 208, a digital rearview mirror display 210, a transmission lever 212, and a turn indicator stalk 214. For example, an operator 216 of the first vehicle 112 can be in the car seat 202.

Figure 3:
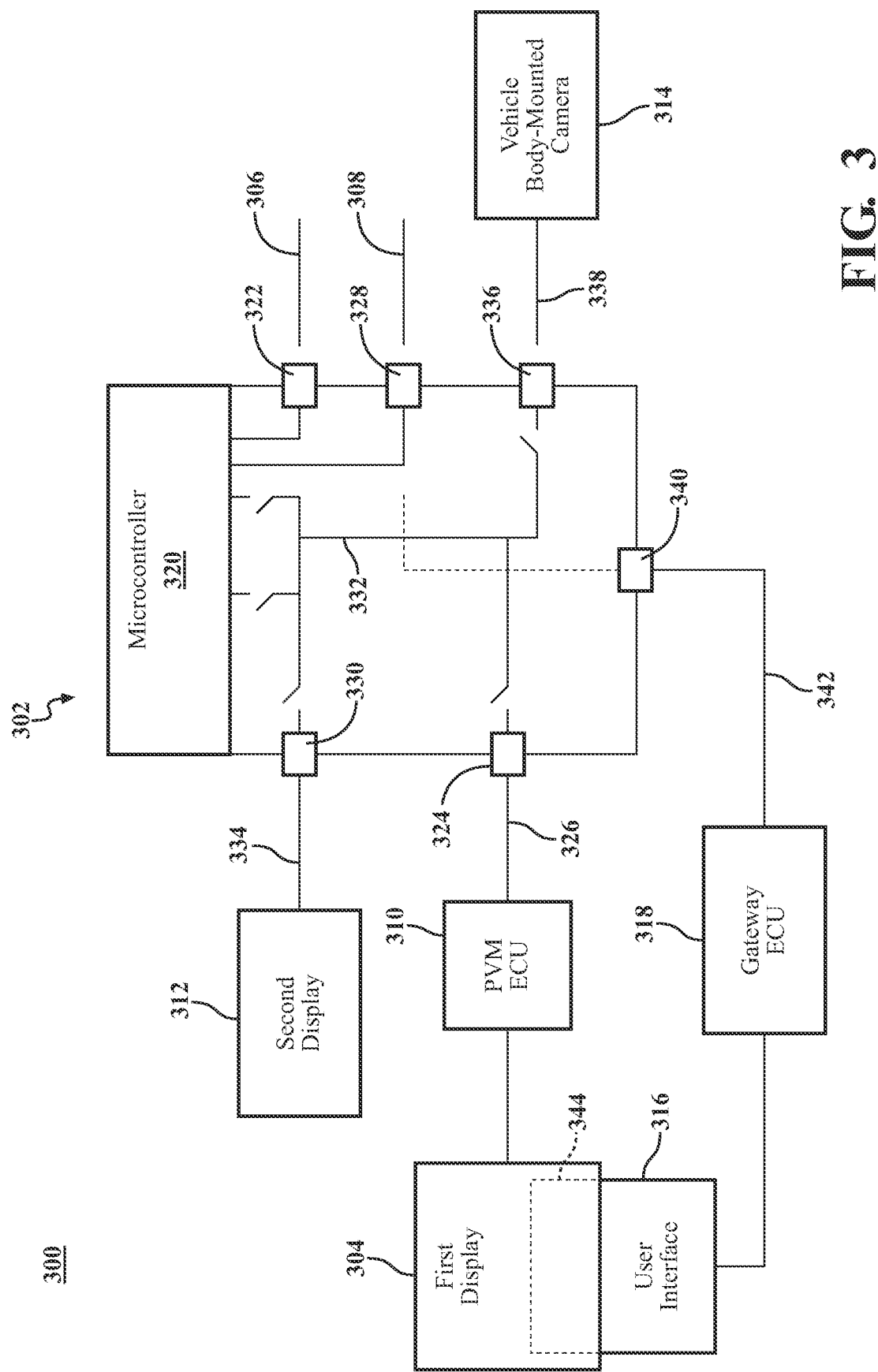
FIG. 3 is a block diagram that illustrates an example of a system for causing images produced by a wireless camera to be presented on a display disposed on a vehicle, according to the disclosed technologies.

FIG. 3 is a block diagram that illustrates an example of a system 300 for causing images produced by a wireless camera to be presented on a display disposed on a vehicle, according to the disclosed technologies. For example, the system 300 can include a video interface 302, a first display 304, and one or more of a first antenna 306 or a second antenna 308. Additionally, for example, the system 300 can include a panoramic view monitor (PVM) electronic control unit (ECU) 310. Additionally, for example, the system 300 can include a second display 312. Additionally, for example, the system 300 can include a vehicle body-mounted camera 314. Additionally, for example, the system 300 can include a user interface 316. Additionally, for example, the system 300 can include a gateway electronic control unit (ECU) 318.

For example, the video interface 302 can be for signals between a wireless camera and the first display 304 disposed on a vehicle. For example, the video interface 302 can include a microcontroller 320, a port 322, and a port 324. For example, the microcontroller 320 can be configured to process analog signals to produce first digital signals. For example, the analog signals can represent images produced by the wireless camera. For example, the first digital signals can represent the images for the first display 304. For example, the port 322 can be configured to be connected to the first antenna 306, disposed on the vehicle, for the analog signals. For example, the port 324 can be configured to be connected to a cable 326 for the first display 304. For example, the video interface 302 can be configured to be disposed on the vehicle. For example, the video interface 302 can be a gigabit video interface. For example, the wireless camera can have two external single pole antennas.

For example, the wireless camera can be the wireless camera 126 illustrated in FIGS. 1A and 1B. For example, the two external single pole antennas can be the first external single pole antenna 128 illustrated in FIGS. 1A and 1B and the second external single pole antenna 130 illustrated in FIGS. 1A and 1B. For example, the first display 304 can be a head unit display. For example, the head unit display can be the head unit display 208 illustrated in FIG. 2. As an alternative, for example, the first display 304 can be a digital rearview mirror display. For example, the digital rearview mirror display can be the digital rearview mirror display 210 illustrated in FIG. 2. As another alternative, for example, the first display 304 can be one of an in-car entertainment display, a combination meter display (instrument display), a head-up display (HUD), a digital side-view mirror display, or the like. For example, the port 324 can be a plurality of ports such that each of the plurality of ports can be configured to be connected to a corresponding cable for a corresponding display. For example, the vehicle can be the first vehicle 112 illustrated in FIGS. 1A and 1B. For example, the first antenna 306 can be one or more of: (1) the first antenna 122 illustrated in FIGS. 1A and 1B or (2) the second antenna 124 illustrated in FIG. 1A.

For example, the video interface 302 can be configured to establish a wireless local area network with the wireless camera to receive the analog signals from the wireless camera. For example, the wireless local area network can be configured to operate in accordance with a Wi-Fi® wireless network protocol.

For example, the wireless camera can be configured to be mounted on a trailer configured to be towed by the vehicle. For example, the trailer can be the trailer 116 illustrated in FIGS. 1A and 1B.

For example, if the first display 304 is a head unit display, then the cable 326 for the first display 304 can be configured to convey the first digital signals from the microcontroller 320 to the head unit display via the panoramic view monitor (PVM) electronic control unit (ECU) 310 disposed on the vehicle. For example, the panoramic view monitor (PVM)

electronic control unit (ECU) 310 can be configured for wired communication, but can lack an ability for wireless communication.

Additionally, for example: (1) the system 300 can further include a second antenna 308 and (2) the video interface 302 can further include a port 328. For example: (1) the port 322 can be configured to be connected to the first antenna 306 and (2) the port 328 can be configured to be connected to the second antenna 308. For example: (1) the first antenna 306 can be disposed at a left, rear corner of a roof of the vehicle and (2) the second antenna 308 can be disposed at a right, rear corner of the roof of the vehicle. For example: (1) the first antenna 306 can be the first antenna 122 illustrated in FIGS. 1A and 1B and (2) the second antenna 308 can be the second antenna 124 illustrated in FIG. 1A.

Additionally, for example: (1) the system 300 can further include the second display 312 and (2) the video interface 302 can further include a port 330 and a switch 332. For example, the microcontroller 320 can be further configured to process the analog signals to produce second digital signals. For example, the second digital signals can represent the images for the second display 312 disposed on the vehicle. For example, the port 330 can be configured to be connected to a cable 334 for the second display 312. For example, the switch 332 can be configured to cause one or more of: (1) the first digital signals to be connected to the first display 304 or (2) the second digital signals to be connected to the second display 312. For example: (1) the first display 304 can be a head unit display and (2) the second display 312 can be a digital rearview mirror display. For example: (1) the head unit display can be the head unit display 208 illustrated in FIG. 2 and (2) the digital rearview mirror display can be the digital rearview mirror display 210 illustrated in FIG. 2. As an alternative, for example, the second display 312 can be one of an in-car entertainment display, a combination meter display (instrument display), a head-up display (HUD), a digital side-view mirror display, or the like. For example, the port 330 can be a plurality of ports such that each of the plurality of ports can be configured to be connected to a corresponding cable for a corresponding display.

For example, the representations of the images for the second display 312 can be different from representations of the images for the first display 304. For example, the microcontroller 320 can be configured to process the analog signals to produce: (1) the first digital signals so that the representations of the images for the first display 304 are characterized as the images having been one or more of cropped or magnified to include portions of the images that are less than a first distance from an object upon which the wireless camera has been mounted, but to exclude portions of the images that are greater than the first distance from the object and (2) the second digital signals so that the representations of the images for the second display 312 are characterized as the images having been one or more of cropped or magnified to include portions of the images that are greater than a second distance from the object upon which the wireless camera has been mounted, but to exclude portions of the images that are less than the second distance from the object. For example: (1) the representations of the images for the first display 304 can mimic images produced by a reversing camera and (2) the representations of the images for the second display 312 can mimic a view observable, by an operator of the vehicle, in a rearview mirror at a time in which the vehicle is not towing the trailer. (Advantageously, the disclosed technologies can preclude a need to have one or more wired cameras disposed on a towed vehicle (e.g., the trailer) and difficulties associated with connecting cables for such one or more wired cameras to ports on a towing vehicle.) For example, the switch 332 can be configured to cause both: (1) the first digital signals to be connected to the first display 304 and (2) the second digital signals to be connected to the second display 312 so that both: (1) the representations of the images for the first display 304 and (2) the representations of the images for the second display 312 are presented concurrently.

For example: (1) the wireless camera can be the wireless camera 126 illustrated in FIGS. 1A and 1B and (2) the object upon which the wireless camera has been mounted can be the trailer 116 illustrated in FIGS. 1A and 1B. For example: (1) the first distance can be a distance $D_1$ illustrated in FIG. 1B and (2) the second distance can be a distance $D_2$ illustrated in FIG. 1B. For example, if: (1) the first display 304 is the head unit display 208 illustrated in FIG. 2 and (2) the second display 312 is the digital rearview mirror display 210 illustrated in FIG. 2, then: (1) the representations of the images for the head unit display 208 can include the child 132 behind the trailer 116 illustrated in FIGS. 1A, 1B, and 2 and (2) the representations of the images for the digital rearview mirror display 210 can include the second vehicle 114 located on the offramp 108 illustrated in FIGS. 1A and 2.

Additionally, for example: (1) the system 300 can further include the vehicle body-mounted camera 314 and (2) the video interface 302 can further include a port 336 and the switch 332. For example, the port 336 can be configured to be connected to a cable 338 for the vehicle body-mounted camera 314. For example, the switch 332 can be configured to cause one or more of: (1) signals, representing images produced by the vehicle body-mounted camera 314, to be connected to the first display 304 or (2) the first digital signals to be connected to the first display 304. For example, the vehicle body-mounted camera 314 can be a center high-mounted stop lamp camera. Alternatively, for example, the vehicle body-mounted camera 314 can be one of a reversing camera, a forward-facing mid-height level camera, a forward-facing upper-height level camera, a bed-mounted camera, an underbody camera, a left side-facing camera, a right side-facing camera, a left digital side-facing mirror camera, a right digital side-facing mirror camera, or the like. For example, the port 336 can be a plurality of ports such that each of the plurality of ports can be configured to be connected to a corresponding cable for a corresponding camera. For example, the first display 304 can be a digital rearview mirror display. Alternatively, for example, the first display 304 can be a head unit display. For example, if the first display 304 is a head unit display, then the cable 326 for the first display 304 can be configured to convey the first digital signals from the microcontroller 320 to the head unit display via the panoramic view monitor (PVM) electronic control unit (ECU) 310 disposed on the vehicle. For example, the vehicle body-mounted camera 314 can be the vehicle body-mounted camera 118 illustrated in FIGS. 1A and 1B, which can be the center high-mounted stop lamp camera 120 illustrated in FIGS. 1A and 1B. For example, the digital rearview mirror display can be the digital rearview mirror display 210 illustrated in FIG. 2. For example, the head unit display can be the head unit display 208 illustrated in FIG. 2.

Additionally, for example: (1) the system 300 can further include the user interface 316 and (2) the video interface 302 can further include a port 340. For example, the port 340 can be configured to be connected to a cable 342 for the user interface 316. For example, the cable 342 for the user interface 316 can be configured to convey one or more of a command signal or a control signal produced by the user interface 316. For example, the user interface 316 can be disposed on the vehicle. For example, the cable 342 for the user interface 316 can be configured to convey the one or more of the command signal or the control signal from the user interface 316 to the port 340 via the gateway electronic control unit (ECU) 318 disposed on the vehicle. For example, the gateway electronic control unit (ECU) 318 can be configured for wired communication, but can lack an ability for wireless communication. For example, the user interface 316 can be a touchscreen user interface 344. For example, if the first display 304 is a head unit display, then the touchscreen user interface 344 can be incorporated into the head unit display.

Additionally, for example, the video interface 302 can be configured to establish a wireless personal area network with the wireless camera to transmit the one or more of the command signal or the control signal to the wireless camera. For example, the wireless personal area network can be configured to use a Bluetooth® Low Energy short-range wireless technology standard. For example, the one or more of the command signal or the control signal transmitted to the wireless camera can be configured to cause one or more of: (1) an establishment of a wireless local area network that includes the wireless camera and the video interface so that the video interface can be configured to receive the analog signals from the wireless camera, (2) a control of a view of the wireless camera, (3) a control of a setting of the wireless camera, (4) an update of software associated with the wireless camera to be transmitted to the wireless camera, or (5) the like.

Additionally, in an implementation, for example, if: (1) the system 300 includes the vehicle body-mounted camera 314 and the user interface 316 and (2) the video interface 302 includes the port 336, the port 340, and the switch 332, then the switch 332 can be configured to cause, in response to a receipt of the one or more of the command signal or the control signal, one or more of: (1) the signals, representing the images produced by the vehicle body-mounted camera 314, to be connected to the first display 304 or (2) the first digital signals to be connected to the first display 304.

For example, in a configuration of this implementation, the user interface 316 can include a turn indicator stalk. For example, the user interface 316 can be configured to cause, in response to a position of the turn indicator stalk being in a specific position to cause a turn signal to be: (1) activated, a production of the one or more of the command signal or the control signal and (2) deactivated, a cessation of the production of the one or more of the command signal or the control signal. Additionally, for example, the switch 332 can be further configured to cause, in response to: (1) a receipt of the one or more of the command signal or the control signal, the first digital signals to be connected to the first display 304 and (2) a cessation of the receipt of the one or more of the command signal or the control signal, the signals, representing the images produced by the vehicle body-mounted camera 314, to be connected to the first display 304.

For example, the turn indicator stalk can be the turn indicator stalk 214 illustrated in FIG. 2. For example, the first display 304 can be a digital rearview mirror display. For example, the digital rearview mirror display can be the digital rearview mirror display 210 illustrated in FIG. 2. That is, for example, if the first display 304 is the digital rearview mirror display 210 illustrated in FIG. 2, then, in response to the receipt of the one or more of the command signal or the control signal, produced in response to the position of the turn indicator stalk 214 being in the specific position to cause a turn signal to be activated, the representations of the images for the digital rearview mirror display 210 can mimic a view observable, by the operator 216 of the first vehicle 112, in a rearview mirror at a time in which the first vehicle 112 is not towing the trailer 116 and can include the second vehicle 114 located on the offramp 108 illustrated in FIGS. 1A and 2. Such a configuration can be desirable to the operator 216 to aid the operator 216 in judging a time at which the operator 216 should cause the first vehicle 112 to move onto the onramp 110 illustrated in FIGS. 1A and 2.

Additionally, in another implementation, for example, if: (1) the system 300 includes the second display 312 and the user interface 316 and (2) the video interface 302 includes the port 330, the port 340, and the switch 332, then: (1) the microcontroller 320 can be further configured to process the analog signals to produce second digital signals and (2) the switch 332 can be configured to cause one or more of: (a) the first digital signals to be connected to the first display 304 or (b) the second digital signals to be connected to the second display 312. For example, the second digital signals can represent the images for the second display 312 disposed on the vehicle.

Additionally, in yet another implementation, for example, the user interface 316 can include a transmission lever. For example, the user interface 316 can be configured to cause, in response to a position of the transmission lever being in: (1) a specific position to cause the vehicle to move in a reverse direction, a production of the one or more of the command signal or the control signal and (2) other than the specific position, a cessation of the production of the one or more of the command signal or the control signal. Additionally, for example, the switch 332 can be further configured to cause, in response to: (1) a receipt of the one or more of the command signal or the control signal, the first digital signals to be connected to the first display 304 and (2) a cessation of the receipt of the one or more of the command signal or the control signal, the first digital signals to be disconnected from the first display 304. For example, the wireless camera can be configured to function as a reversing camera.

For example, the transmission lever can be the transmission lever 212 illustrated in FIG. 2. For example, the first display 304 can be a head unit display. For example, the head unit display can be the head unit display 208 illustrated in FIG. 2. That is, for example, if the first display 304 is the head unit display 208 illustrated in FIG. 2, then, in response to the receipt of the one or more of the command signal or the control signal, produced in response to the position of the transmission lever 212 being in the specific position to cause the first vehicle 112 to move in a reverse direction, the representations of the images for the head unit display 208 can mimic images produced by a reversing camera and can include the child 132 behind the trailer 116 illustrated in FIGS. 1A, 1B, and 2. Such an implementation can be desirable to the operator 216 to aid the operator 216 in judging a time at which the operator 216 should cause the first vehicle 112 to move in the reverse direction to cause the trailer 116 to be parked in the parking space A-1.

Figure 4:
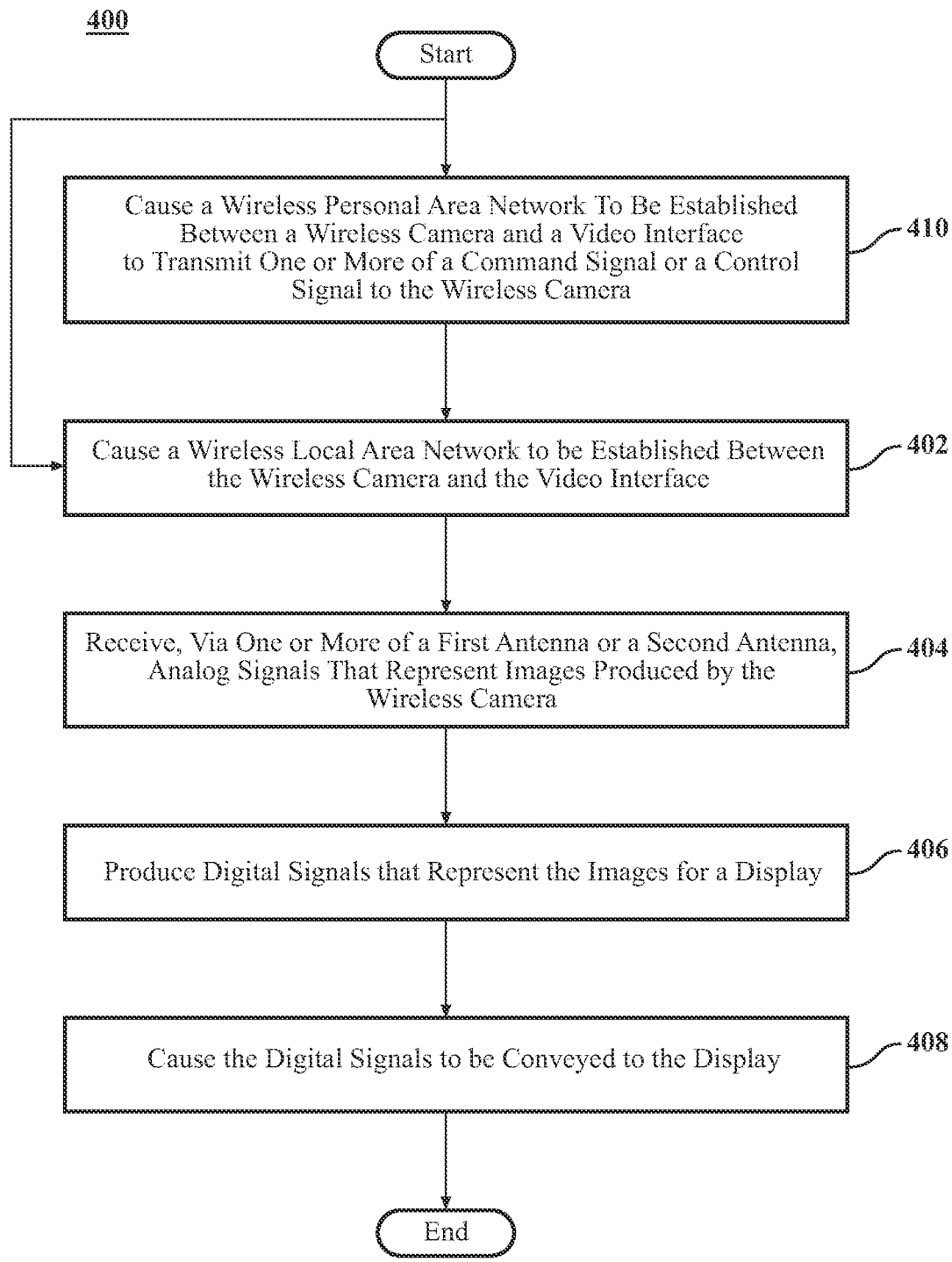
FIG. 4 includes a flow diagram that illustrates an example of a method that is associated with causing images produced by a wireless camera to be presented on a display disposed on a vehicle, according to the disclosed technologies.

FIG. 4 includes a flow diagram that illustrates an example of a method 400 that is associated with causing images produced by a wireless camera to be presented on a display disposed on a vehicle, according to the disclosed technologies. Although the method 400 is described in combination with the video interface 302 illustrated in FIG. 3, one of skill in the art understands, in light of the description herein, that the method 400 is not limited to being implemented by the video interface 302 illustrated in FIG. 3. Rather, the video interface 302 illustrated in FIG. 3 is an example of a system that may be used to implement the method 400. Additionally, although the method 400 is illustrated as a generally serial process, various aspects of the method 400 may be able to be executed in parallel.

In the method 400, at an operation 402, for example, the video interface 302, disposed on a vehicle, can cause a wireless local area network to be established between a wireless camera and the video interface 302. For example, the wireless local area network can be configured to operate in accordance with a Wi-Fi® wireless network protocol. For example, the wireless camera can have two external single pole antennas.

At an operation 404, for example, the video interface 302 can receive, via one or more of the first antenna 306 disposed on the vehicle or the second antenna 308 disposed on the vehicle, analog signals. For example, the analog signals can represent images produced by the wireless camera.

At an operation 406, for example, the video interface 302 can produce digital signals. For example, the digital signals can represent the images for the display.

At an operation 408, for example, the video interface 302 can cause the digital signals to be conveyed to the display.

Additionally, at an operation 410, for example, the video interface 302 can cause a wireless personal area network to be established between the wireless camera and the video interface 302 to transmit one or more of a command signal or a control signal to the wireless camera. For example, the wireless personal area network can be configured to use a Bluetooth® Low Energy short-range wireless technology standard.

Figure 5:
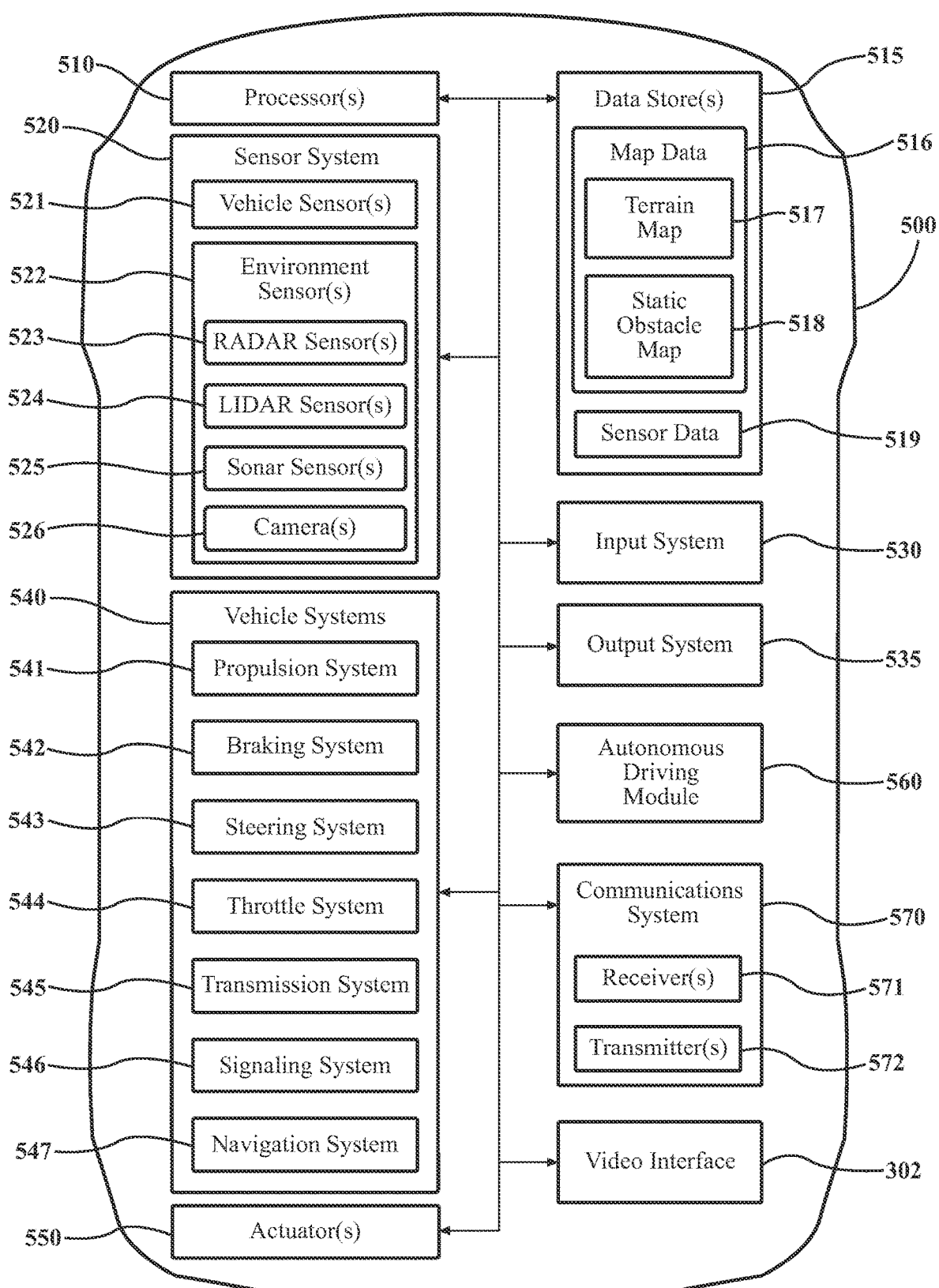
FIG. 5 includes a block diagram that illustrates an example of elements disposed on a vehicle, according to the disclosed technologies.

FIG. 5 includes a block diagram that illustrates an example of elements disposed on a vehicle 500, according to the disclosed technologies. As used herein, a "vehicle" can be any form of powered transport. In one or more implementations, the vehicle 500 can be an automobile. While arrangements described herein are with respect to automobiles, one of skill in the art understands, in light of the description herein, that embodiments are not limited to automobiles. For example, functions and/or operations of one or more of the first vehicle 112 (illustrated in FIGS. 1A and 1B) can be realized by the vehicle 500.

In some embodiments, the vehicle 500 can be configured to switch selectively between an automated mode, one or more semi-automated operational modes, and/or a manual mode. Such switching can be implemented in a suitable manner, now known or later developed. As used herein, "manual mode" can refer that all of or a majority of the navigation and/or maneuvering of the vehicle 500 is performed according to inputs received from a user (e.g., human driver). In one or more arrangements, the vehicle 500 can be a conventional vehicle that is configured to operate in only a manual mode.

In one or more embodiments, the vehicle 500 can be an automated vehicle. As used herein, "automated vehicle" can refer to a vehicle that operates in an automated mode. As used herein, "automated mode" can refer to navigating and/or maneuvering the vehicle 500 along a travel route using one or more computing systems to control the vehicle 500 with minimal or no input from a human driver. In one or more embodiments, the vehicle 500 can be highly automated or completely automated. In one embodiment, the vehicle 500 can be configured with one or more semi-automated operational modes in which one or more computing systems perform a portion of the navigation and/or maneuvering of the vehicle along a travel route, and a vehicle operator (i.e., driver) provides inputs to the vehicle 500 to perform a portion of the navigation and/or maneuvering of the vehicle 500 along a travel route.

For example, Standard J3016 202104, Taxonomy and Definitions for Terms Related to Driving Automation Systems for On-Road Motor Vehicles, issued by the Society of Automotive Engineers (SAE) International on Jan. 16, 2014, and most recently revised on Apr. 30, 2021, defines six levels of driving automation. These six levels include: (1) level 0, no automation, in which all aspects of dynamic driving tasks are performed by a human driver; (2) level 1, driver assistance, in which a driver assistance system, if selected, can execute, using information about the driving environment, either steering or acceleration/deceleration tasks, but all remaining driving dynamic tasks are performed by a human driver; (3) level 2, partial automation, in which one or more driver assistance systems, if selected, can execute, using information about the driving environment, both steering and acceleration/deceleration tasks, but all remaining driving dynamic tasks are performed by a human driver; (4) level 3, conditional automation, in which an automated driving system, if selected, can execute all aspects of dynamic driving tasks with an expectation that a human driver will respond appropriately to a request to intervene; (5) level 4, high automation, in which an automated driving system, if selected, can execute all aspects of dynamic driving tasks even if a human driver does not respond appropriately to a request to intervene; and (6) level 5, full automation, in which an automated driving system can execute all aspects of dynamic driving tasks under all roadway and environmental conditions that can be managed by a human driver.

The vehicle 500 can include various elements. The vehicle 500 can have any combination of the various elements illustrated in FIG. 5. In various embodiments, it may not be necessary for the vehicle 500 to include all of the elements illustrated in FIG. 5. Furthermore, the vehicle 500 can have elements in addition to those illustrated in FIG. 5. While the various elements are illustrated in FIG. 5 as being located within the vehicle 500, one or more of these elements can be located external to the vehicle 500. Furthermore, the elements illustrated may be physically separated by large distances. For example, as described, one or more components of the disclosed system can be implemented within the vehicle 500 while other components of the system can be implemented within a cloud-computing environment, as described below. For example, the elements can include one or more processors 510, one or more data stores 515, a sensor system 520, an input system 530, an output system 535, vehicle systems 540, one or more actuators 550, one or more automated driving modules 560, a communications system 570, and a video interface 302.

In one or more arrangements, the one or more processors 510 can be a main processor of the vehicle 500. For example, the one or more processors 510 can be an electronic control unit (ECU). For example, functions and/or operations of the panoramic view monitor (PVM) electronic control unit (ECU) 310 (illustrated in FIG. 3), the gateway electronic control unit (ECU) 318 (illustrated in FIG. 3), and the microcontroller 320 (illustrated in FIG. 3) can be realized by the one or more processors 510.

The one or more data stores 515 can store, for example, one or more types of data. The one or more data stores 515 can include volatile memory and/or non-volatile memory. Examples of suitable memory for the one or more data stores 515 can include Random-Access Memory (RAM), flash memory, Read-Only Memory (ROM), Programmable Read-Only Memory (PROM), Erasable Programmable Read-Only Memory (EPROM), Electrically Erasable Programmable Read-Only Memory (EEPROM), registers, magnetic disks, optical disks, hard drives, any other suitable storage medium, or any combination thereof. The one or more data stores 515 can be a component of the one or more processors 510. Additionally or alternatively, the one or more data stores 515 can be operatively connected to the one or more processors 510 for use thereby. As used herein, "operatively connected" can include direct or indirect connections, including connections without direct physical contact. As used herein, a statement that a component can be "configured to" perform an operation can be understood to mean that the component requires no structural alterations, but merely needs to be placed into an operational state (e.g., be provided with electrical power, have an underlying operating system running, etc.) in order to perform the operation.

In one or more arrangements, the one or more data stores 515 can store map data 516. The map data 516 can include maps of one or more geographic areas. In some instances, the map data 516 can include information or data on roads, traffic control devices, road markings, structures, features, and/or landmarks in the one or more geographic areas. The map data 516 can be in any suitable form. In some instances, the map data 516 can include aerial views of an area. In some instances, the map data 516 can include ground views of an area, including 360-degree ground views. The map data 516 can include measurements, dimensions, distances, and/or information for one or more items included in the map data 516 and/or relative to other items included in the map data 516. The map data 516 can include a digital map with information about road geometry. The map data 516 can be high quality and/or highly detailed.

In one or more arrangements, the map data 516 can include one or more terrain maps 517. The one or more terrain maps 517 can include information about the ground, terrain, roads, surfaces, and/or other features of one or more geographic areas. The one or more terrain maps 517 can include elevation data of the one or more geographic areas. The map data 516 can be high quality and/or highly detailed. The one or more terrain maps 517 can define one or more ground surfaces, which can include paved roads, unpaved roads, land, and other things that define a ground surface.

In one or more arrangements, the map data 516 can include one or more static obstacle maps 518. The one or more static obstacle maps 518 can include information about one or more static obstacles located within one or more geographic areas. A "static obstacle" can be a physical object whose position does not change (or does not substantially change) over a period of time and/or whose size does not change (or does not substantially change) over a period of time. Examples of static obstacles can include trees, buildings, curbs, fences, railings, medians, utility poles, statues, monuments, signs, benches, furniture, mailboxes, large rocks, and hills. The static obstacles can be objects that extend above ground level. The one or more static obstacles included in the one or more static obstacle maps 518 can have location data, size data, dimension data, material data, and/or other data associated with them. The one or more static obstacle maps 518 can include measurements, dimensions, distances, and/or information for one or more static obstacles. The one or more static obstacle maps 518 can be high quality and/or highly detailed. The one or more static obstacle maps 518 can be updated to reflect changes within a mapped area.

In one or more arrangements, the one or more data stores 515 can store sensor data 519. As used herein, "sensor data" can refer to any information about the sensors with which the vehicle 500 can be equipped including the capabilities of and other information about such sensors. The sensor data 519 can relate to one or more sensors of the sensor system 520. For example, in one or more arrangements, the sensor data 519 can include information about one or more lidar sensors 524 of the sensor system 520.

In some arrangements, at least a portion of the map data 516 and/or the sensor data 519 can be located in one or more data stores 515 that are located onboard the vehicle 500. Additionally or alternatively, at least a portion of the map data 516 and/or the sensor data 519 can be located in one or more data stores 515 that are located remotely from the vehicle 500.

The sensor system 520 can include one or more sensors. As used herein, a "sensor" can refer to any device, component, and/or system that can detect and/or sense something. The one or more sensors can be configured to detect and/or sense in real-time. As used herein, the term "real-time" can refer to a level of processing responsiveness that is perceived by a user or system to be sufficiently immediate for a particular process or determination to be made, or that enables the processor to keep pace with some external process.

In arrangements in which the sensor system 520 includes a plurality of sensors, the sensors can work independently from each other. Alternatively, two or more of the sensors can work in combination with each other. In such a case, the two or more sensors can form a sensor network. The sensor system 520 and/or the one or more sensors can be operatively connected to the one or more processors 510, the one or more data stores 515, and/or another element of the vehicle 500 (including any of the elements illustrated in FIG. 5). The sensor system 520 can acquire data of at least a portion of the external environment of the vehicle 500 (e.g., nearby vehicles). The sensor system 520 can include any suitable type of sensor. Various examples of different types of sensors are described herein. However, one of skill in the art understands that the embodiments are not limited to the particular sensors described herein.

The sensor system 520 can include one or more vehicle sensors 521. The one or more vehicle sensors 521 can detect, determine, and/or sense information about the vehicle 500 itself. In one or more arrangements, the one or more vehicle sensors 521 can be configured to detect and/or sense position and orientation changes of the vehicle 500 such as, for example, based on inertial acceleration. In one or more arrangements, the one or more vehicle sensors 521 can include one or more accelerometers, one or more gyroscopes, an inertial measurement unit (IMU), a dead-reckoning system, a global navigation satellite system (GNSS), a global positioning system (GPS), a navigation system 547, and/or other suitable sensors. The one or more vehicle sensors 521 can be configured to detect and/or sense one or more characteristics of the vehicle 500. In one or more arrangements, the one or more vehicle sensors 521 can include a speedometer to determine a current speed of the vehicle 500.

Additionally or alternatively, the sensor system 520 can include one or more environment sensors 522 configured to acquire and/or sense driving environment data. As used herein, "driving environment data" can include data or information about the external environment in which a vehicle is located or one or more portions thereof. For example, the one or more environment sensors 522 can be configured to detect, quantify, and/or sense obstacles in at least a portion of the external environment of the vehicle 500 and/or information/data about such obstacles. Such obstacles may be stationary objects and/or dynamic objects. The one or more environment sensors 522 can be configured to detect, measure, quantify, and/or sense other things in the external environment of the vehicle 500 such as, for example, lane markers, signs, traffic lights, traffic signs, lane lines, crosswalks, curbs proximate the vehicle 500, off-road objects, etc.

Various examples of sensors of the sensor system 520 are described herein. The example sensors may be part of the one or more vehicle sensors 521 and/or the one or more environment sensors 522. However, one of skill in the art understands that the embodiments are not limited to the particular sensors described.

In one or more arrangements, the one or more environment sensors 522 can include one or more radar sensors 523, one or more lidar sensors 524, one or more sonar sensors 525, and/or one more cameras 526. In one or more arrangements, the one or more cameras 526 can be one or more high dynamic range (HDR) cameras or one or more infrared (IR) cameras. For example, the one or more cameras 526 can be used to record a reality of a state of an item of information that can appear in the digital map. For example, functions and/or operations of the vehicle body-mounted camera 118 (illustrated in FIGS. 1A and 1B), the center high-mounted stop lamp camera 120 (illustrated in FIGS. 1A and 1B), and the vehicle body-mounted camera 314 (illustrated in FIG. 3) can be realized by the one or more cameras 526.

The input system 530 can include any device, component, system, element, arrangement, or groups thereof that enable information/data to be entered into a machine. The input system 530 can receive an input from a vehicle passenger (e.g., a driver or a passenger). The output system 535 can include any device, component, system, element, arrangement, or groups thereof that enable information/data to be presented to a vehicle passenger (e.g., a driver or a passenger). For example, functions and/or operations of the transmission lever 212 (illustrated in FIG. 2), the turn indicator stalk 214 (illustrated in FIG. 2), and the user interface 316 (illustrated in FIG. 3) can be realized by the input system 530. For example, functions and/or operations of the head unit display 208 (illustrated in FIG. 2), the digital rearview mirror display 210 (illustrated in FIG. 2), the first display 304 (illustrated in FIG. 3), and the second display 312 (illustrated in FIG. 3) can be realized by the output system 535.

Various examples of the one or more vehicle systems 540 are illustrated in FIG. 5. However, one of skill in the art understands that the vehicle 500 can include more, fewer, or different vehicle systems. Although particular vehicle systems can be separately defined, each or any of the systems or portions thereof may be otherwise combined or segregated via hardware and/or software within the vehicle 500. For example, the one or more vehicle systems 540 can include a propulsion system 541, a braking system 542, a steering system 543, a throttle system 544, a transmission system 545, a signaling system 546, and/or the navigation system 547. Each of these systems can include one or more devices, components, and/or a combination thereof, now known or later developed.

The navigation system 547 can include one or more devices, applications, and/or combinations thereof, now known or later developed, configured to determine the geographic location of the vehicle 500 and/or to determine a travel route for the vehicle 500. The navigation system 547 can include one or more mapping applications to determine a travel route for the vehicle 500. The navigation system 547 can include a global positioning system, a local positioning system, a geolocation system, and/or a combination thereof.

The one or more actuators 550 can be any element or combination of elements operable to modify, adjust, and/or alter one or more of the vehicle systems 540 or components thereof responsive to receiving signals or other inputs from the one or more processors 510 and/or the one or more automated driving modules 560. Any suitable actuator can be used. For example, the one or more actuators 550 can include motors, pneumatic actuators, hydraulic pistons, relays, solenoids, and/or piezoelectric actuators.

The one or more processors 510 and/or the one or more automated driving modules 560 can be operatively connected to communicate with the various vehicle systems 540 and/or individual components thereof. For example, the one or more processors 510 and/or the one or more automated driving modules 560 can be in communication to send and/or receive information from the various vehicle systems 540 to control the movement, speed, maneuvering, heading, direction, etc. of the vehicle 500. The one or more processors 510 and/or the one or more automated driving modules 560 may control some or all of these vehicle systems 540 and, thus, may be partially or fully automated.

The one or more processors 510 and/or the one or more automated driving modules 560 may be operable to control the navigation and/or maneuvering of the vehicle 500 by controlling one or more of the vehicle systems 540 and/or components thereof. For example, when operating in an automated mode, the one or more processors 510 and/or the one or more automated driving modules 560 can control the direction and/or speed of the vehicle 500. The one or more processors 510 and/or the one or more automated driving modules 560 can cause the vehicle 500 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" can mean to make, force, compel, direct, command, instruct, and/or enable an event or action to occur or at least be in a state where such event or action may occur, either in a direct or indirect manner. The communications system 570 can include one or more receivers 571 and/or one or more transmitters 572. The communications system 570 can receive and transmit one or more messages through one or more wireless communications channels. For example, the one or more wireless communications channels can be in accordance with the Institute of Electrical and Electronics Engineers (IEEE) 802.11p standard to add wireless access in vehicular environments (WAVE) (the basis for Dedicated Short-Range Communications (DSRC)), the 3rd Generation Partnership Project (3GPP) Long-Term Evolution (LTE) Vehicle-to-Everything (V2X) (LTE-V2X) standard (including the LTE Uu interface between a mobile communication device and an Evolved Node B of the Universal Mobile Telecommunications System), the 3GPP fifth generation (5G) New Radio (NR) Vehicle-to-Everything (V2X) standard (including the 5G NR Uu interface), or the like. For example, the communications system 570 can include "connected vehicle" technology. "Connected vehicle" technology can include, for example, devices to exchange communications between a vehicle and other devices in a packet-switched network. Such other devices can include, for example, another vehicle (e.g., "Vehicle to Vehicle" (V2V) technology), roadside infrastructure (e.g., "Vehicle to Infrastructure" (V2I) technology), a cloud platform (e.g., "Vehicle to Cloud" (V2C) technology), a pedestrian (e.g., "Vehicle to Pedestrian" (V2P) technology), or a network (e.g., "Vehicle to Network" (V2N) technology. "Vehicle to Everything" (V2X) technology can integrate aspects of these individual communications technologies.

Moreover, the one or more processors 510, the one or more data stores 515, and the communications system 570 can be configured to one or more of form a micro cloud, participate as a member of a micro cloud, or perform a function of a leader of a mobile micro cloud. A micro cloud can be characterized by a distribution, among members of the micro cloud, of one or more of one or more computing resources or one or more data storage resources in order to collaborate on executing operations. The members can include at least connected vehicles.

The vehicle 500 can include one or more modules, at least some of which are described herein. The modules can be implemented as computer-readable program code that, when executed by the one or more processors 510, implement one or more of the various processes described herein. One or more of the modules can be a component of the one or more processors 510. Additionally or alternatively, one or more of the modules can be executed on and/or distributed among other processing systems to which the one or more processors 510 can be operatively connected. The modules can include instructions (e.g., program logic) executable by the one or more processors 510. Additionally or alternatively, the one or more data store 515 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 500 can include one or more automated driving modules 560. The one or more automated driving modules 560 can be configured to receive data from the sensor system 520 and/or any other type of system capable of capturing information relating to the vehicle 500 and/or the external environment of the vehicle 500. In one or more arrangements, the one or more automated driving modules 560 can use such data to generate one or more driving scene models. The one or more automated driving modules 560 can determine position and velocity of the vehicle 500. The one or more automated driving modules 560 can determine the location of obstacles, obstacles, or other environmental features including traffic signs, trees, shrubs, neighboring vehicles, pedestrians, etc.

The one or more automated driving modules 560 can be configured to receive and/or determine location information for obstacles within the external environment of the vehicle 500 for use by the one or more processors 510 and/or one or more of the modules described herein to estimate position and orientation of the vehicle 500, vehicle position in global coordinates based on signals from a plurality of satellites, or any other data and/or signals that could be used to determine the current state of the vehicle 500 or determine the position of the vehicle 500 with respect to its environment for use in either creating a map or determining the position of the vehicle 500 in respect to map data.

The one or more automated driving modules 560 can be configured to determine one or more travel paths, current automated driving maneuvers for the vehicle 500, future automated driving maneuvers and/or modifications to current automated driving maneuvers based on data acquired by the sensor system 520, driving scene models, and/or data from any other suitable source such as determinations from the sensor data 519. As used herein, "driving maneuver" can refer to one or more actions that affect the movement of a vehicle. Examples of driving maneuvers include: accelerating, decelerating, braking, turning, moving in a lateral direction of the vehicle 500, changing travel lanes, merging into a travel lane, and/or reversing, just to name a few possibilities. The one or more automated driving modules 560 can be configured to implement determined driving maneuvers. The one or more automated driving modules 560 can cause, directly or indirectly, such automated driving maneuvers to be implemented. As used herein, "cause" or "causing" means to make, command, instruct, and/or enable an event or action to occur or at least be in a state where such event or action may occur, either in a direct or indirect manner. The one or more automated driving modules 560 can be configured to execute various vehicle functions and/or to transmit data to, receive data from, interact with, and/or control the vehicle 500 or one or more systems thereof (e.g., one or more of vehicle systems 540). For example, functions and/or operations of an automotive navigation system can be realized by the one or more automated driving modules 560.

Detailed embodiments are disclosed herein. However, one of skill in the art understands, in light of the description herein, that the disclosed embodiments are intended only as examples. Therefore, specific structural and functional details disclosed herein are not to be interpreted as limiting, but merely as a basis for the claims and as a representative basis for teaching one of skill in the art to variously employ the aspects herein in virtually any appropriately detailed structure. Furthermore, the terms and phrases used herein are not intended to be limiting but rather to provide an understandable description of possible implementations. Various embodiments are illustrated in FIGS. 1A, 1B, and 2-5, but the embodiments are not limited to the illustrated structure or application.

The flowchart and block diagrams in the figures illustrate the architecture, functionality, and operation of possible implementations of systems, methods, and computer program products according to various embodiments. In this regard, each block in flowcharts or block diagrams may represent a module, segment, or portion of code, which comprises one or more executable instructions for implementing the specified logical function(s). One of skill in the art understands, in light of the description herein, that, in some alternative implementations, the functions described in a block may occur out of the order depicted by the figures. For example, two blocks depicted in succession may, in fact, be executed substantially concurrently, or the blocks may be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suitable. A typical combination of hardware and software can be a processing system with computer-readable program code that, when loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and that, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. As used herein, the phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples of the computer-readable storage medium would include, in a non-exhaustive list, the following: a portable computer diskette, a hard disk drive (HDD), a solid-state drive (SSD), a read-only memory (ROM), an erasable programmable read-only memory (EPROM or flash memory), a portable compact disc read-only memory (CD-ROM), a digital versatile disc (DVD), an optical storage device, a magnetic storage device, or any suitable combination of the foregoing. As used herein, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores such modules. The memory associated with a module may be a buffer or may be cache embedded within a processor, a random-access memory (RAM), a ROM, a flash memory, or another suitable electronic storage medium. In still further aspects, a module as used herein, may be implemented as an application-specific integrated circuit (ASIC), a hardware component of a system on a chip (SoC), a programmable logic array (PLA), or another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the disclosed technologies may be written in any combination of one or more programming languages, including an object-oriented programming language such as Java™, Smalltalk, C++, or the like, and conventional procedural programming languages such as the "C" programming language or similar programming languages. The program code may execute entirely on a user's computer, partly on a user's computer, as a stand-alone software package, partly on a user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . or . . . " as used herein refers to and encompasses any and all possible combinations of one or more of the associated listed items. For example, the phrase "at least one of A, B, or C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A video interface for signals between a wireless camera and a first display disposed on a vehicle, comprising:
    a microcontroller configured to process analog signals, representing images produced by the wireless camera, to produce first digital signals, representing the images for the first display, wherein representations of the images for the first display are characterized as the images having been at least one of cropped or magnified to include portions of the images that are less than a first distance from an object upon which the wireless camera has been mounted, but to exclude portions of the images that are greater than the first distance from the object;
    a first port configured to be connected to an antenna, disposed on the vehicle, for the analog signals; and
    a second port configured to be connected to a cable for the first display,
    wherein the video interface is configured to be disposed on the vehicle, and
    wherein the wireless camera has two external single pole antennas.

2. The video interface of claim 1, wherein the video interface is configured to establish a wireless local area network with the wireless camera to receive the analog signals from the wireless camera.

3. The video interface of claim 2, wherein the wireless local area network is configured to operate in accordance with a Wi-Fi® wireless network protocol.

4. The video interface of claim 1:
    wherein the microcontroller is further configured to process the analog signals to produce second digital signals, representing the images for a second display disposed on the vehicle; and
    further comprising:
        a third port configured to be connected to a cable for the second display; and
        a switch configured to cause at least one of:
            the first digital signals to be connected to the first display, or
            the second digital signals to be connected to the second display.

5. The video interface of claim 4, wherein representations of the images for the second display are different from the representations of the images for the first display.

6. The video interface of claim 5, wherein the microcontroller is configured to process the analog signals to produce the second digital signals so that the representations of the images for the second display are characterized as the images having been at least one of cropped or magnified to include portions of the images that are greater than a second distance from the object upon which the wireless camera has been mounted, but to exclude portions of the images that are less than the second distance from the object.

7. The video interface of claim 4, wherein the switch is configured to cause both the first digital signals to be connected to the first display and the second digital signals to be connected to the second display so that both the representations of the images for the first display and the representations of the images for the second display are presented concurrently.

8. The video interface of claim 1, further comprising:
a third port configured to be connected to a cable for a vehicle body-mounted camera; and
a switch configured to cause at least one of:
signals, representing images produced by the vehicle body-mounted camera, to be connected to the first display, or
the first digital signals to be connected to the first display.

9. The video interface of claim 1, further comprising a third port configured to be connected to a cable for a user interface, wherein the cable for the user interface is configured to convey at least one of a command signal or a control signal produced by the user interface, and wherein the user interface is disposed on the vehicle.

10. The video interface of claim 9, wherein the video interface is configured to establish a wireless personal area network with the wireless camera to transmit the at least one of the command signal or the control signal to the wireless camera.

11. The video interface of claim 10, wherein the wireless personal area network is configured to use a Bluetooth® Low Energy short-range wireless technology standard.

12. The video interface of claim 9, further comprising:
a fourth port configured to be connected to a cable for a vehicle body-mounted camera; and
a switch configured to cause, in response to a receipt of the at least one of the command signal or the control signal, at least one of:
signals, representing images produced by the vehicle body-mounted camera, to be connected to the first display, or
the first digital signals to be connected to the first display.

13. The video interface of claim 12, wherein:
the user interface comprises a turn indicator stalk, and
the user interface is configured to cause, in response to a position of the turn indicator stalk being in a specific position to cause a turn signal to be:
activated, a production of the at least one of the command signal or the control signal, and
deactivated, a cessation of the production of the at least one of the command signal or the control signal.

14. The video interface of claim 9:
wherein the microcontroller is further configured to process the analog signals to produce second digital signals, representing the images for a second display disposed on the vehicle; and
further comprising:
a fourth port configured to be connected to a cable for the second display; and
a switch configured to cause, in response to a receipt of the at least one of the command signal or the control signal, at least one of:
the first digital signals to be connected to the first display, or
the second digital signals to be connected to the second display.

15. The video interface of claim 9:
wherein the user interface comprises a transmission lever,
wherein the user interface is configured to cause, in response to a position of the transmission lever being in:
a specific position to cause the vehicle to move in a reverse direction, a production of the at least one of the command signal or the control signal, and
other than the specific position, a cessation of the production of the at least one of the command signal or the control signal.

16. A method for causing images produced by a wireless camera to be presented on a display disposed on a vehicle, comprising:
causing, by a video interface disposed on the vehicle, a wireless local area network to be established between the wireless camera and the video interface;
receiving, by the video interface via an antenna disposed on the vehicle, analog signals, representing images produced by the wireless camera;
producing, by the video interface, digital signals, representing the images for the display, wherein representations of the images for the display are characterized as the images having been at least one of cropped or magnified to include portions of the images that are less than a distance from an object upon which the wireless camera has been mounted, but to exclude portions of the images that are greater than the distance from the object; and
causing, by the video interface, the digital signals to be conveyed to the display,
wherein the wireless camera has two external single pole antennas.

17. The method of claim 16, wherein the wireless local area network is configured to operate in accordance with a Wi-Fi® wireless network protocol.

18. The method of claim 16, further comprising causing, by the video interface, a wireless personal area network to be established between the wireless camera and the video interface to transmit at least one of a command signal or a control signal to the wireless camera.

19. The method of claim 18, wherein the wireless personal area network is configured to use a Bluetooth® Low Energy short-range wireless technology standard.

20. A non-transitory computer-readable medium for causing images produced by a wireless camera to be presented on a display disposed on a vehicle, the non-transitory computer-readable medium including instructions that, when executed by one or more processors disposed on the vehicle, cause the one or more processors to:
cause a wireless local area network to be established between the wireless camera and a video interface disposed on the vehicle;
receive, via an antenna disposed on the vehicle, analog signals, representing images produced by the wireless camera;
produce digital signals, representing the images for the display, wherein representations of the images for the display are characterized as the images having been at least one of cropped or magnified to include portions of the images that are less than a distance from an object upon which the wireless camera has been mounted, but to exclude portions of the images that are greater than the distance from the object; and
cause the digital signals to be conveyed to the display, wherein the wireless camera has two external single pole antennas.

* * * * *